US006668895B2

(12) United States Patent
Treadway

(10) Patent No.: US 6,668,895 B2
(45) Date of Patent: Dec. 30, 2003

(54) LABELING MACHINE WITH MECHANICAL TIMING MEANS

(76) Inventor: Curtis Treadway, 141 Shelby Dr., Aiken, SC (US) 29803

( * ) Notice: Subject to any disclaimer, the term of this patent is extended or adjusted under 35 U.S.C. 154(b) by 168 days.

(21) Appl. No.: 10/027,399

(22) Filed: Dec. 22, 2001

(65) Prior Publication Data

US 2002/0088552 A1 Jul. 11, 2002

Related U.S. Application Data

(63) Continuation-in-part of application No. 09/453,040, filed on Dec. 2, 1999, now abandoned.

(51) Int. Cl.[7] .......... B32B 31/02

(52) U.S. Cl. .......... 156/541; 156/542; 156/DIG. 2; 156/DIG. 25; 156/DIG. 27; 156/DIG. 33; 156/DIG. 45

(58) Field of Search .......... 156/DIG. 2, DIG. 28, 156/DIG. 33, DIG. 45, DIG. 39, 566, 543, 361, 362, 368, 541, 542, DIG. 1, DIG. 25, DIG. 27

(56) References Cited

U.S. PATENT DOCUMENTS 3,329,550 A * 7/1967 Kucheck .......... 156/285
3,729,362 A * 4/1973 French et al. .......... 156/542
4,608,110 A * 8/1986 Smith .......... 156/250
4,769,103 A * 9/1988 Koike et al. .......... 156/384

* cited by examiner

*Primary Examiner*—Curtis Mayes
*Assistant Examiner*—Cheryl N. Hawkins

(57) ABSTRACT

A labeling machine has a rotatably mounted drive wheel with alternating knurled and recessed sections formed on its circumference. The drive wheel rotates at a predetermined number of revolutions per minute, and the respective lengths of the knurled and recessed sections are pre-selected to provide a timing function that synchronizes operation of various parts of the machine. A label-carrying backing is driven along a path of travel between a supply drum and a take-up drum when a knurled section is in meshing agreement with a rotatably mounted pressure wheel. The backing is held against travel by a detent member when a recessed section is in juxtaposition with the pressure wheel, and a rotatably mounted cam operates an air valve that causes the detent member to momentarily release the backing just before a knurled section engages the pressure wheel. The backing follows a path of travel that takes it through a label-peeling device that sequentially separates each label from the backing and applies it to a conveyor-transported product package at a label-applying station. Each knurled section has a length equal to the sum of the spacing between the labels and a major portion of the length of the label itself so that the backing is driven by rotation of the drive wheel a distance sufficient to apply a label to a product package moving past the label-peeling device, and locate the next label to be applied at the spot just vacated by the prior label, and for a following product package to enter the label-applying station during the time the backing is held against travel by the detent member. The effective circumferential extent of the knurled section is adjustable to match labels of differing lengths by forming the drive wheel of three independent drive discs, one of which is mounted for rotational adjustment on the drive shaft so that it may lead the knurled sections of the remaining drive discs.

10 Claims, 2 Drawing Sheets

LABELING MACHINE WITH MECHANICAL TIMING MEANS

CROSS REFERENCE TO RELATED APPLICATIONS

This is a continuation-in-part of U.S. application Ser. No. 09/453,040, filed Dec. 2, 1999, now abandoned

BACKGROUND OF THE INVENTION

1. Field of the Invention

This invention relates, generally, to labeling machines. More particularly, it relates to a labeling machine that employs mechanical structure to achieve synchronization of parts.

2. Description of Prior Art

Labeling machines sequentially transfer labels from a backing onto product packages. Typically, the backing is a continuous strip of paper or paper substitute having a label-carrying side that has been treated with a very light adhesive. The labels are arrayed upon the adhesive carrying side of the backing in longitudinally spaced apart alignment with one another, The adhesive has sufficient strength to hold the labels onto the backing only if little or no separation force is applied. The backing having labels follows a path of travel begins at a supply drum or reel, continues to a label-peeling means positioned at a label-applying station where labels are sequentially separated from the backing and individually applied to product packages carried by a conveyor belt or other conveyor means, and ends at a take-up drum or reel that collects the label-free backing.

In prior machines, a photoelectric eye or similar device that distinguishes between the labels and the backing to which they are adhered is positioned between the supply drum and the label peeling device. When a space between labels is detected, the photoelectric eye sends a stop signal to a braking means that stops rotation of the supply and take-up drums. However, the package conveyor belt continues to move, thererby allowing a just labeled product package to enter the label-applying station. The photoelectric eye then sends a start signal so the supply drum and take-up drum resume rotation so that another label can be applied. When another gap between labels on the backing is detected, the cycle repeats itself. In this way, there is no need to start and stop the conveyor as in still earlier machines.

However, photoelectric eyes are not inexpensive, nor are they completely reliable. Various anomalies in the backing, for example, for example can cause such a device to miss detection of a gap between labels. This causes the backing to continue traveling at a time it should held motionless, leading to misapplied labels.

What is needed, then, is a labeling machine that enables continuous operation of a transport but which is not reliant upon the technology of photoelectric eyes.

However it was not obvious to those of ordinary skill in this art how an improved labeling machine could be provided, in view of the art considered as a whole at the time the present invention was made.

SUMMARY OF THE INVENTION

The long-standing but heretofore unfulfilled need for an innovation that overcomes limitations of the prior art is now met by a new, useful and nonobvious invention. The present novel labeling machine includes a rotatable-mounted supply drum, an elongate length of label-carrying backing coiled about the supply drum, and a rotatably-mounted take-up drum for collecting the backing after labels have been removed therefrom. A label peeling means, positioned between the supply drum and the take-up drum, sequentially removes labels from the backing and applies them to product packages that are transported to a label applying station by a conveyor means.

A rotatably mounted drive wheel has a plurality of circumferentially spaced apart knurled sections formed on its circumference and a plurality of circumferentially spaced apart recessed sections formed on its circumference. The knurled sections and recessed sections are disposed in alternating sequence about the circumference of the drive wheel. A suitable drive means including a drive shaft is provided for continuously rotating the drive wheel at a predetermined number of revolutions per minute. A rotatably mounted pressure wheel is disposed in meshing engagement with the drive wheel. A detent means opposes travel of the backing, but it momentarily releases the backing just before a knurled section of the drive wheel is engaged by the pressure wheel so that the rotation of the drive wheel drives the backing through the label peeling means and effects application of a label to a product package at the label applying station. The detent is not released when the backing is disposed between a drive wheel recessed section and the pressure wheel; the detent means holds the backing against travel during that segment of the rotation of the drive wheel so that a product package carried by said conveyor means travels a predetermined distance and no label is applied thereto.

Each of the knurled sections has a length substantially equal to the sum of the common length of the labels being applied plus the space between the labels in a particular job so that the rotation of the drive wheel at the predetermined number of revolutions per minute sequentially brings the knurled sections into juxtaposition with the pressure wheel for a predetermined time. The predetermined amount of time is substantially equal to the time required for application of a label to a product package.

The drive wheel is collectively formed by three disc drives, each of which is mounted on the common drive shaft for conjoint rotation therewith. Two of the three discs are in rotational alignment with one another so that their respective knurled sections engages the pressure wheel at the same time and so that their respective recessed sections are in non engaging relation to the pressure wheel at the same time. A third disc is rotationally displaced relative to the other discs so that its knurled section engages the pressure wheel before engagement thereof by the respective knurled section of the other discs. The third disc may be mounted at any rotational position of adjustment on the drive shaft. If its knurled section is slightly rotationally advanced relative to the rotation of the other discs, the novel labeling machine is capable of applying slightly longer labels to a product. If the knurled section is even more advanced, the machine can handle labels of even greater length. In other words, the amount of rotational advance of the third disc is adjusted so that the effective combined circumferential extent of the respective knurled sections of all three discs matches the sum of the length of the distance between the label to be applied, plus the length of a major portion of the label.

Each of the recessed sections has a predetermined extent so that the rotation of the drive wheel at the predetermined number of revolutions per minute brings the recessed sections into juxtaposition with the pressure wheel for a predetermined amount of time The predetermined amount of time is substantially equal to the time required for a product package that has just been labeled to exit the label-applying station and for a following product package to enter the label applying station.

The primary object of this invention is to provide a labeling machine formed exclusively of mechanical parts so that it is more reliable than machines that rely on photoelectric eyes.

Another important object is to provide a labeling machine having moving parts that are synchronized with one another by mechanical means so that mislabeling is minimized or eliminated.

Another major object is to provide a labeling machine having mechanical parts that are easily adjustable to enable the machine to apply labels of different lengths.

These and other important objects, features and advantages of the invention will become apparent as this description proceeds.

The invention accordingly comprises the features of construction, combination of elements and arrangements of parts that will be exemplified in the construction hereinafter set forth and the scope of the invention will be indicated in the claims.

BRIEF DESCRIPTION OF THE DRAWINGS

For a fuller understanding of the nature and objects of the invention, reference should be made to the following detailed description, taken in connection with the drawings, in which.

DETAILED DESCRIPTION OF THE PREFERRED EMBODIMENT

Figure 1:
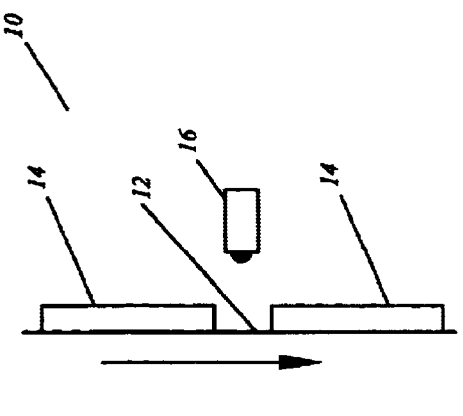
FIG. 1 PRIOR ART
FIG. 1 is a side elevation view of a prior art structure.

FIG. 1 depicts a prior art assembly 10 that includes a strip of backing 12, longitudinally spaced apart labels 14, and a photoelectric eye 16. Substandard product labeling may occur if eye 16 malfunctions, or if anomalies in backing 12 or labels 14 cause eye 16 to function improperly. An exemplary embodiment of the machine is denoted as a whole by the reference numeral 20 in FIG. 2.

Supply drum 22 is mounted for rotation about axle 24 in the direction indicated by directional arrow 26. An elongate strip of labels carrying backing 28 carrying longitudinally-spaced apart labels 30 is coiled about the supply drum in a well known way. As supply drum 22 rotates, take up drum 32 rotates about axle 34 in the direction of arrow 36 at a speed sufficient to take up backing 28 as is it uncoiled from said supply drum 22.

The path of travel of backing 28 as it travels from supply drum 22 to take up drum 32 carries it past detent means 38, one-way gate 40, first tension wheel 42, an industry standard label peeling device 44 that sequentially separates labels 30 from backing 28 drive wheel 46, pressure wheel 48 and second tension wheel 50.

Drive wheel 46 is continuously rotated by a suitable driving means at a predetermined fixed revolutions per minute. Said drive wheel includes a plurality of arcuate knurled sections 52 that are circumferentially spaced apart from one another, and a plurality of unknurled recessed sections 54 that are circumferentially spaced apart from one another intermediate the knurled sections.

Knurled sections 52 cooperate with pressure wheel 48 to positively drive backing 28 between then- In other words when a knurled section 52 rotates past pressure wheel 48 backing is driven from supply drum 22 to take up drum 32 and a label 30 is peeled from backing 28 onto a product package 60 carried by conveyor belt 62. Dogs 64 are secured to belt 62 and prevent each package 60 from slipping relative to belt 62 when resistance is encountered at the label applying station adjacent the label-peeling device 44. Device 66 is a roller device that applies pressure to each label 30 after it has been applied at the label applying station.

Figure 3:
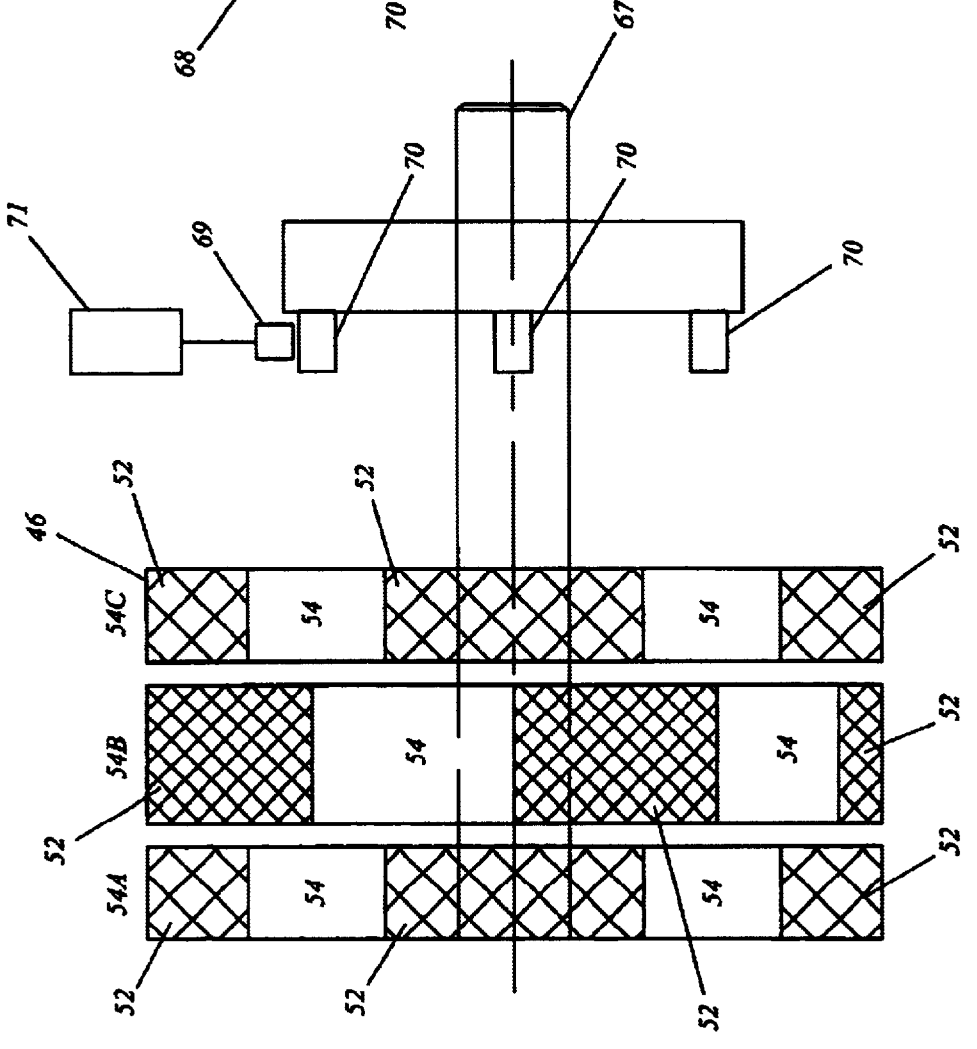
FIG. 3 is an end view depicting the novel drive discs.

Significantly, as best understood in connection with FIG. 3, the effective circumferential extent of knurled sections 52 are adjustable by drive discs 54A,54B, and 54C that collectively form drive wheel 46. Discs 54A, 54B, 54C are mounted on a common drive shaft 67. All three discs are affixed to said shaft, but the rotational position of middle disc 54B is adjustable, clockwise or counterclockwise, relative to the rotational position of disc 54A and 54C. This enables middle disc 54B to be rotationally advanced, such as depicted in FIG. 3 to effectively lengthen the circumferential extent of the collective knurled sections 52. In this way, the rotational position of middle disc 54B can be rotationally adjusted to enable the collective knurled sections 52 to match the sum of the length of the space 28A between the labels 30, plus a major portion of the label itself.

The knurled portion of the drum intercepts the backing at a point equal to the length of the said space 28A between the labels and the leading edge of the label then proceeds to first advance the length of the space between the labels and then advances a major portion of the label onto the article being carried on the conveyor system. The remaining portion of the label is pulled completely onto the article by the forward motion of the article on the conveyor system, thus leaving the following label 30 next to be applied reposed in the exact position as the prior label for application to a product package 60.

The recessed sections of the drum 52 are equal to the distance between the dogs 64 plus the length of the knurled section.

Figure 2:
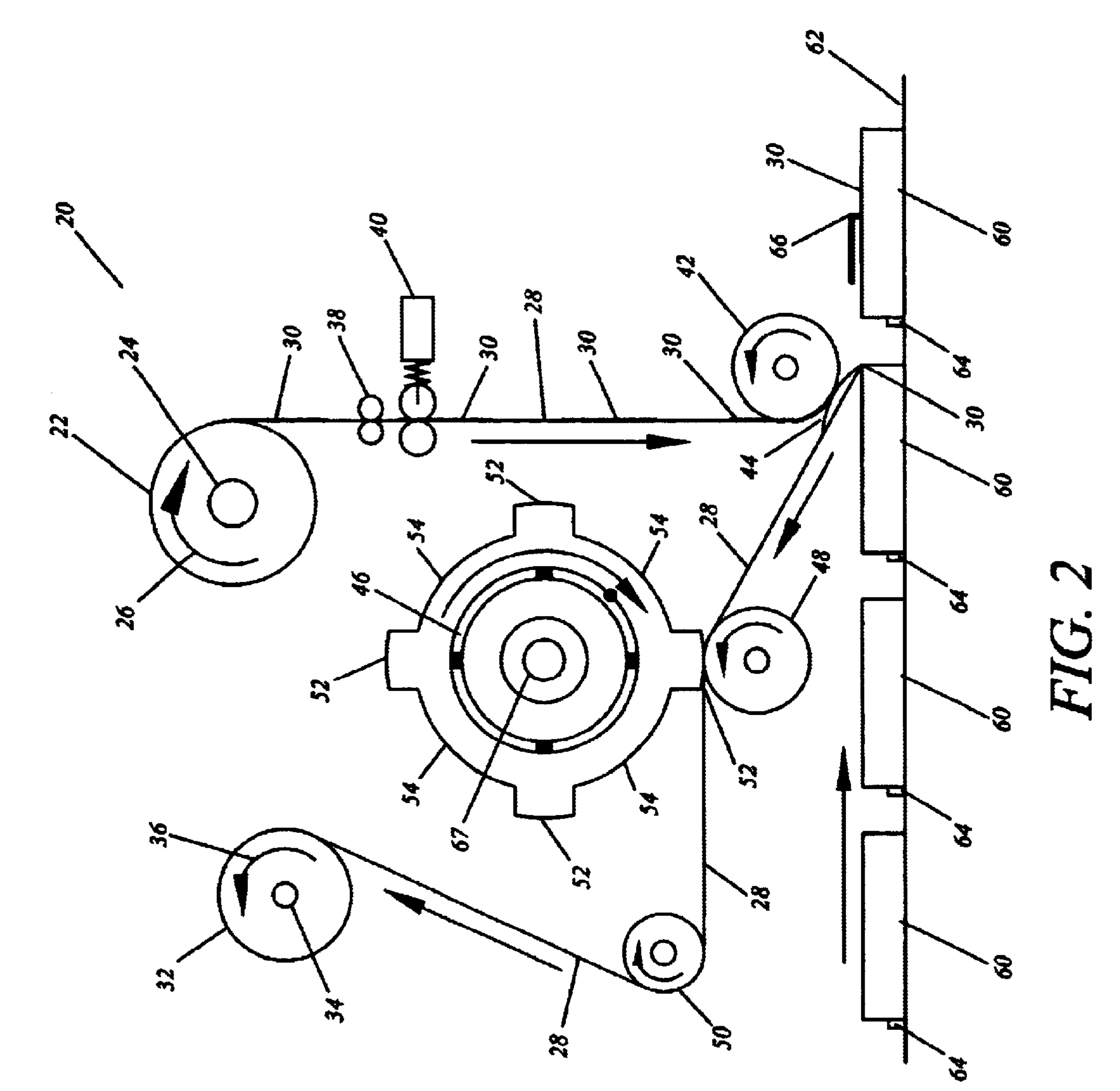
FIG. 2 is a side elevation view of the novel structure.
Figure 4:
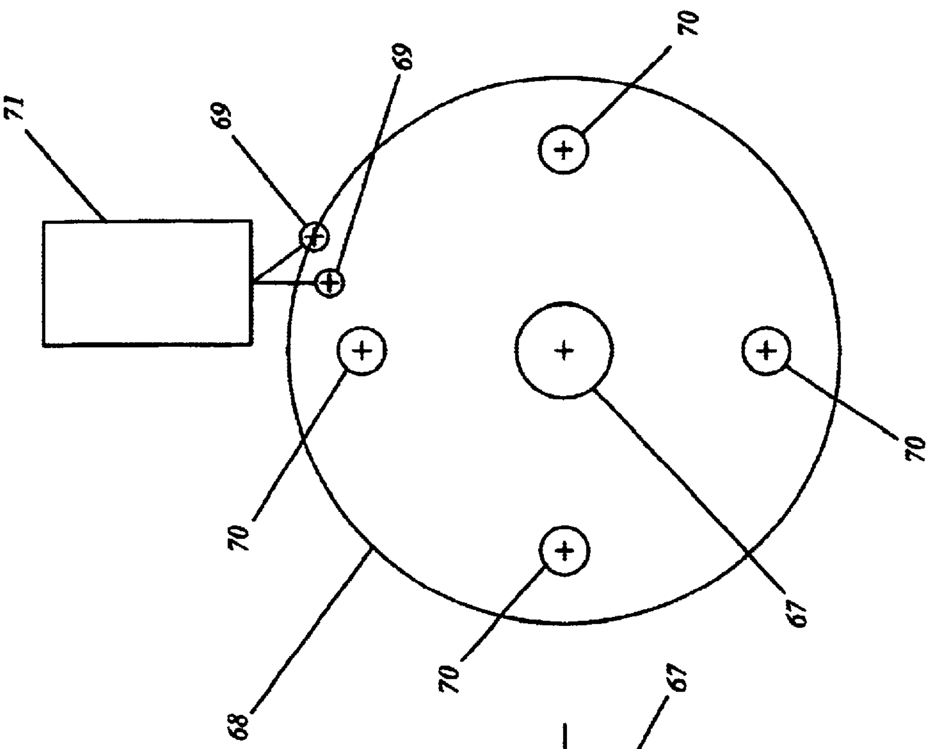
FIG. 4 is a side view of the novel means for controlling the momentary release of the detent means.

As indicated in FIG. 2, detent means 38 engages backing 28 to oppose its forward travel when engaged and one way gate 40 provides tensioning and prevents reverse travel of said backing at all times. Detent means 38 disengages from backing 28 in a pre-determined timed manner when activated by air valve 71 (FIGS. 3 and 4) that has a pivotally mounted actuator 69. Disc or cam 68 is mounted on drive shaft 67 for conjoint rotation therewith and said disc carries plurality of axially extended protrusions, collectively noted 70 that are in predetermined circumferentially spaced relationship with one another. Protrusions 70 sequentially contact and abuttingly displace actuator 69 as drive shaft 67 and hence 68 disc rotates, as indicated by the dotted line in FIG. 4. When actuator 69 is displaced it activates air valve 71 that releases detent means 38 momentarily so that the backing 28 may undergo forward travel as a knurled section 52 engages pressure wheel 48. The rotational position of disc 68 relative to drive shaft 67 is adjusted so that detent means 38 momentarily releases backing 28 just before a knurled section 52 engages pressure roller 48.

When rotation of drive wheel 46 brings a recessed section 54 thereof into juxtaposition with pressure wheel 48 the traction provided by the knurled surface is absent and rotation of said drive wheel does not drive backing 28, there being no driving force present because recessed section 54 does not meshingly engage pressure wheel 48.

However conveyor belt 62 continues to travel, so that a just-labeled product package exits the label applying station and a following product package enters the label applying station. The length of each recessed section 54 is correlated with the speed of rotation of drive wheel 46 so that the time required for each recessed section to rotate past pressure wheel 48 is equal to the time required for a just labeled package to exit the label applying station and for its following product package to enter into said label-applying station. At that time, another knurled section 52 rotates into meshing engagement with pressure wheel 48, the above described process repeated, and another label is applied. When a label 30 has been fully transferred to a product package 60 another recessed section 54 rotates into relationship with pressure wheel 48 and the holding power of detent means 38 stops advancement of backing 28 until the next product package 60 enters into the label applying station and the next knurled section 52 enters into relationship with said pressure wheel 48.

In this way, all moving parts are in synchronous relation to one another and any need for an electric eye is obviated. The mechanical structure of this invention is highly reliable and results in much less down time than the labeling devices heretofore known.

This invention represents a major breakthrough in the art of labeling machines. Being drawn to a pioneering invention, the claims that follow are entitled, as a matter of law, to broad interpretation to protect the heart or essence of the invention from piracy.

It will thus be seen that the objects set forth above and those made apparent from the foregoing description are efficiently attained. Since certain changes may be made in the foregoing construction without departing from the scope of the invention, it is intended that all matters contained in the foregoing construction or shown in the accompanying drawings shall be interpreted as illustrated and not in a limited sense.

It is also understood that the following claims are intended to cover all of the generic and specific features of the invention herein described, and all the statements of the scope of the invention that, as a matter of language, might be said to fall therebetween.

Now that the invention has been described:

What is claimed is:

1. A labeling machine, comprising:

a rotatably-mounted supply drum;

an elongate length of label-carrying backing being coiled about said supply drum;

a rotatably mounted take-up drum for collecting said backing after labels have been removed therefrom;

a label-peeling means for sequentially removing labels from said backing, said label peeling means adapted to apply labels to product packages that are transported to a label applying station by conveyor means;

said label-peeling means being positioned between said supply drum and said take-up drum;

a rotatably mounted drive wheel having a plurality of circumferentially spaced apart knurled sections formed on its circumference and a plurality of circumferentially spaced apart recessed sections formed on its circumference, said knurled sections and recessed sections being disposed in alternating sequence about said circumference of said drive wheel;

a drive shaft onto which said drive wheel is mounted for conjoint rotation;

said drive shaft and hence said drive wheel being rotated at a predetermined number of revolutions per minute;

a rotatably mounted pressure wheel disposed in meshing engagement with said knurled sections of said drive wheel;

a detent means for opposing travel of said backing;

releasing means for momentary releasing said detent just before a knurled section of said drive wheel engages said pressure wheel so that rotation of said drive wheel drives said backing through said label peeling means and affects application of a label to a product package at said label applying station, and;

said pressure wheel being disengaged from said drive wheel when respective recessed sections of said drive wheel are in juxtaposition with said pressure wheel so that said detent means holds said backing against travel so that a product package carried by said conveyor means travels a predetermined distance and no label is applied thereto during said disengagement.

2. The labeling machine of claim 1, wherein each of the said knurled sections has a length equal to the sum of the space between the labels and the length of a major portion of the labels so that rotation of said drive wheel at said predetermined number of revolutions per minute brings said knurled sections in juxtaposition with said pressure wheel for a predetermined amount of time, said predetermined amount of time being equal to a time required for application of a label to a product package, thereby insuring perfect positioning of the next label for application to the next product package.

3. The labeling machine of claim 1, wherein said drive wheel is collectively formed by a plurality of drive discs that are mounted on said drive shaft for conjoint rotation therewith, wherein each of the said drive discs have a plurality of circumferentially spaced apart knurled sections formed on its circumference and a plurality of circumferentially spaced apart recessed sections formed on its circumference, said knurled sections and recessed sections being disposed in alternating sequence about said circumference of each drive disc, and wherein at least one drive disc of said plurality of drive discs is mounted for independent rotational adjustment about said drive shaft so that its knurled sections may be rotationally advanced relative to the knurled sections of drive discs that are not mounted for independent rotational adjustment about said drive shaft, whereby rotatably mounting at least one drive disc in rotationally advanced relation to said drive discs that are not independently rotatable effectively lengthens the circumferential extent of the knurled section of said drive wheel to enable engagement of labels of different lengths, effectively securing the exact placement of labels on product packages and pre-positioning subsequent labels for application.

4. The labeling machine of claim 1, wherein said releasing means includes an air valve having a pivotally mounted actuator, said air valve controlling opening and closing of said detent means, said actuator being actuated sequentially by abutting engagement with a plurality of axially extending of protrusions mounted on a cam that is carried by said drive shaft and which rotates conjointly therewith, and protrusions being circumferentially spaced apart from one another on said cam in a predetermined spaced relationship such that said protrusions sequentially displace said pivotally mounted actuator and activate said air valve in a predetermined timed manner so that said detent momentarily releases said backing just prior to engagement of a knurled section and said pressure wheel.

5. The labeling machine of claim 1, wherein each of the recessed sections has a predetermined extent so that the rotation of said drive wheel at said predetermined number of revolutions per minute brings said recessed sections into juxtaposition with said pressure wheel for a predetermined time, said predetermined amount of time being equal to the time required for a product package that has just been labeled to exit said label-applying station and for a following product package to enter said label-applying station.

6. The labeling machine of claim 5, further comprising a one way gate means for preventing reverse travel for said backing.

7. The labeling machine of claim 6, wherein said detent means is positioned between said supply drum and said label-peeling means.

8. The labeling machine of claim 7, wherein said one-way gate means is positioned between said supply drum and label-peeling means.

9. The labeling machine of claim 8, further comprising a first rotatably mounted tensioning roller positioned between said supply drum and said label-peeling means.

10. The labeling machine of claim 9, further comprising a second rotatably mounted tensioning roller positioned between said drive wheel and said take-up drum.

* * * * *